(12) United States Patent
Stille et al.

(10) Patent No.: US 8,636,248 B2
(45) Date of Patent: Jan. 28, 2014

(54) RETRACTING TAILWHEEL ASSEMBLY AND FIN

(75) Inventors: Brandon L. Stille, Cheshire, CT (US); Steven D. Weiner, Orange, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 13/410,749

(22) Filed: Mar. 2, 2012

(65) Prior Publication Data

US 2013/0228646 A1 Sep. 5, 2013

(51) Int. Cl.
*B64C 25/00* (2006.01)

(52) U.S. Cl.
USPC ......................................................... 244/109

(58) Field of Classification Search
USPC .................................. 244/102 R, 104 FP, 109
See application file for complete search history.

(56) References Cited

U.S. PATENT DOCUMENTS

| | | | | |
|---|---|---|---|---|
| 1,906,143 A | * | 4/1933 | Evans | 244/6 |
| 2,117,786 A | * | 5/1938 | Blume | 244/109 |
| 2,182,333 A | * | 12/1939 | Cowey | 244/102 R |
| 2,220,546 A | * | 11/1940 | Saulnier | 244/102 R |
| 2,312,553 A | * | 3/1943 | Hudson | 244/109 |
| 2,355,210 A | * | 8/1944 | Eddy | 244/109 |
| 2,459,982 A | * | 1/1949 | Wells | 244/102 R |
| 2,497,489 A | * | 2/1950 | Coursen et al. | 92/85 R |
| 2,506,178 A | * | 5/1950 | Shaw | 244/50 |
| 2,544,278 A | * | 3/1951 | Nickell | 244/50 |
| 2,705,935 A | | 4/1955 | Peterson | |
| 2,959,373 A | | 11/1960 | Zuck | |
| 2,964,271 A | | 12/1960 | Strawn | |
| 3,128,065 A | | 4/1964 | Landes | |
| 2011/0168835 A1 | | 7/2011 | Oliver | |

FOREIGN PATENT DOCUMENTS

GB 494542 10/1938

OTHER PUBLICATIONS

Notification of Transmittal of the Extended Search Report and the European Opinion for European Application No. 13157459.2-1754 Jul. 10, 2013.

* cited by examiner

*Primary Examiner* — Tien Dinh
*Assistant Examiner* — Keith L Dixon
(74) *Attorney, Agent, or Firm* — Cantor Colburn LLP

(57) ABSTRACT

A tailwheel assembly for an aircraft includes a ventral fin including a fixed airframe portion of the ventral fin and a moveable tailwheel portion of the ventral fin. A tailwheel strut extends through the ventral fin and includes a fixed first strut portion and an extendable second strut portion having the moveable tailwheel portion of the ventral fin secured thereto. A tailwheel is secured to the extendable second strut portion. A method of operating a tailwheel assembly for an aircraft includes extending an extendable portion of a tailwheel strut from an airframe of the aircraft. The tailwheel strut has a tailwheel secured thereto and is located at least partially in a ventral fin of the aircraft. A tailwheel portion of the ventral fin is moved away from a fixed airframe portion of the ventral fin via extension of the extendable portion of the tailwheel strut.

20 Claims, 3 Drawing Sheets

RETRACTING TAILWHEEL ASSEMBLY AND FIN

BACKGROUND OF THE INVENTION

The subject matter disclosed herein relates to aircraft. More specifically, the subject disclosure relates to landing gear structures for aircraft.

Aircraft, such as airplanes, helicopters, turbo props and tilt rotor aircraft typically include landing gear for supporting the aircraft on the ground, and allowing for ground travel of the aircraft. The landing gear typically includes one or more wheels mounted to one or more struts extending from the airframe.

Helicopters in particular typically include an extending tail with a tailwheel located at the extending tail. In many helicopters, the extending tail also includes a tail anti-torque rotor for stabilizing flight of the aircraft, or a tail propeller, which provides propulsive force for the helicopter. The tail rotor or propeller may be located at the extending tail such that the strut and tailwheel are configured to provide ground clearance for the tail rotor or propeller during ground operations, ensuring that the tail rotor or propeller do not contact the ground, thereby preventing damage. Further, to increase aerodynamic performance of the helicopter, some tailwheel landing gear configurations include a fairing around the tailwheel and tailwheel strut fixed to the extending tail.

BRIEF DESCRIPTION OF THE INVENTION

According to one aspect of the invention, a tailwheel assembly for an aircraft includes a ventral fin including a fixed airframe portion of the ventral fin and a moveable tailwheel portion of the ventral fin. A tailwheel strut extends through the ventral fin and includes a fixed first strut portion and an extendable second strut portion having the moveable tailwheel portion of the ventral fin secured thereto. A tailwheel is secured to the extendable second strut portion.

According to another aspect of the invention, a helicopter includes an airframe having an extending tail and a tailwheel assembly. The tailwheel assembly includes a ventral fin having a fixed airframe portion of the ventral fin secured to the extending tail and a moveable tailwheel portion of the ventral fin. A tailwheel strut extends through the ventral fin and includes a fixed first strut portion and an extendable second strut portion having the moveable tailwheel portion of the ventral fin secured thereto. A tailwheel is secured to the extendable second strut portion.

According to yet another aspect of the invention, a method of operating a tailwheel assembly for an aircraft includes extending an extendable portion of a tailwheel strut from an airframe of the aircraft. The tailwheel strut has a tailwheel secured thereto and is located at least partially in a ventral fin of the aircraft. A tailwheel portion of the ventral fin is moved away from a fixed airframe portion of the ventral fin via extension of the extendable portion of the tailwheel strut.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
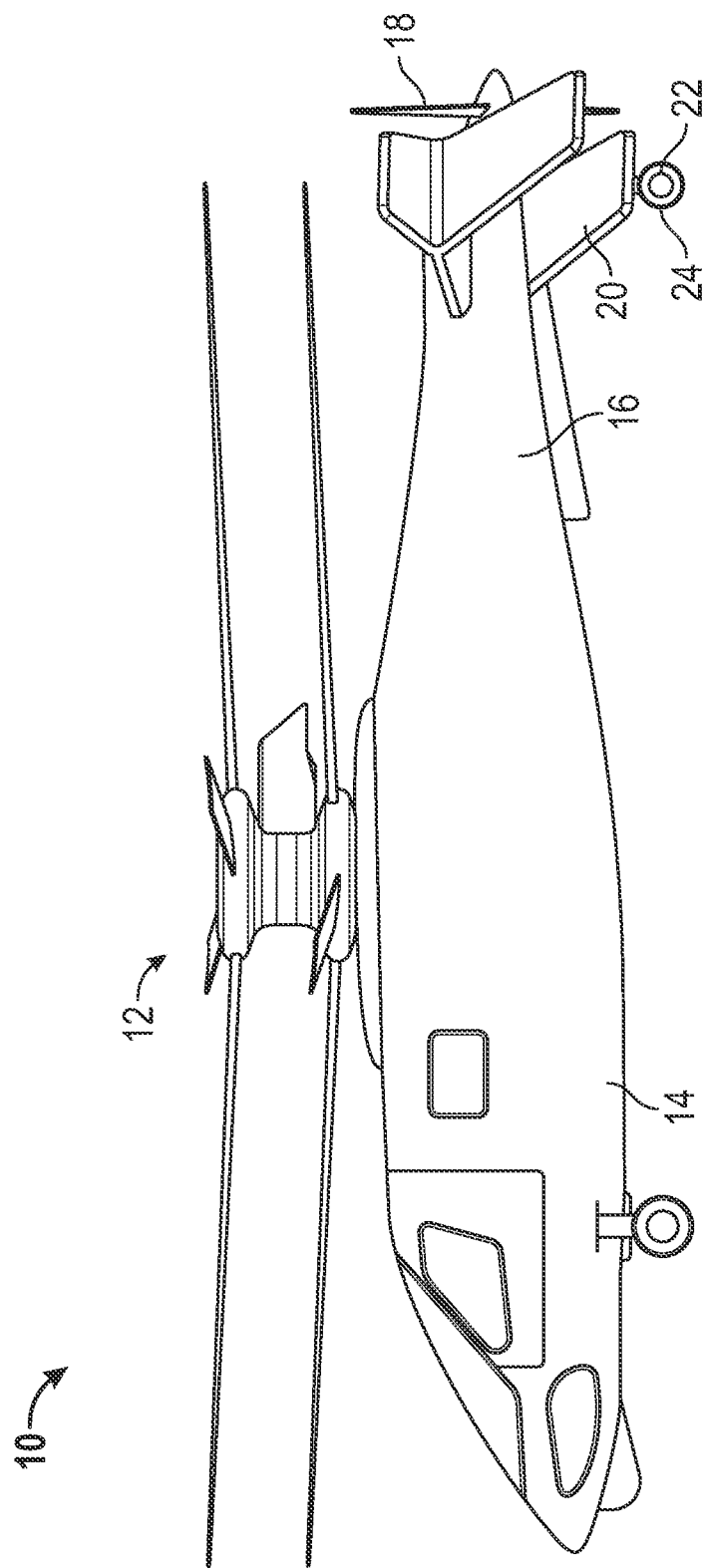
FIG. 1 is a schematic view of an embodiment of a helicopter.

Shown in FIG. 1 is a schematic of a rotary wing aircraft, in this embodiment, a helicopter 10. The helicopter 10 includes a main rotor assembly 12, and an airframe 14 having an extending tail 16 at which is mounted a tail propeller 18. The tail propeller 18 is configured to provide propulsive thrust for the helicopter 10. Although the embodiment illustrated includes a tail propeller 18, other embodiments such as those having an anti-torque rotor disposed at the extending tail 16 would benefit from the structure disclosed herein. Further, even though the aircraft illustrated is a helicopter 10, it is to be appreciated that other machines, such as turbo props or tilt-rotor aircraft may also benefit from the system of the present disclosure. The extending tail 16 further includes a ventral fin 20 extending, in some embodiments, substantially downwardly from the extending tail 16 to stabilize the helicopter 10 during flight. In the embodiment shown, the ventral fin 20 is located forward of the tail propeller 18, but it is to be appreciated that in other embodiments the ventral fin 20 may be located rearward of the tail propeller 18.

Figure 2:
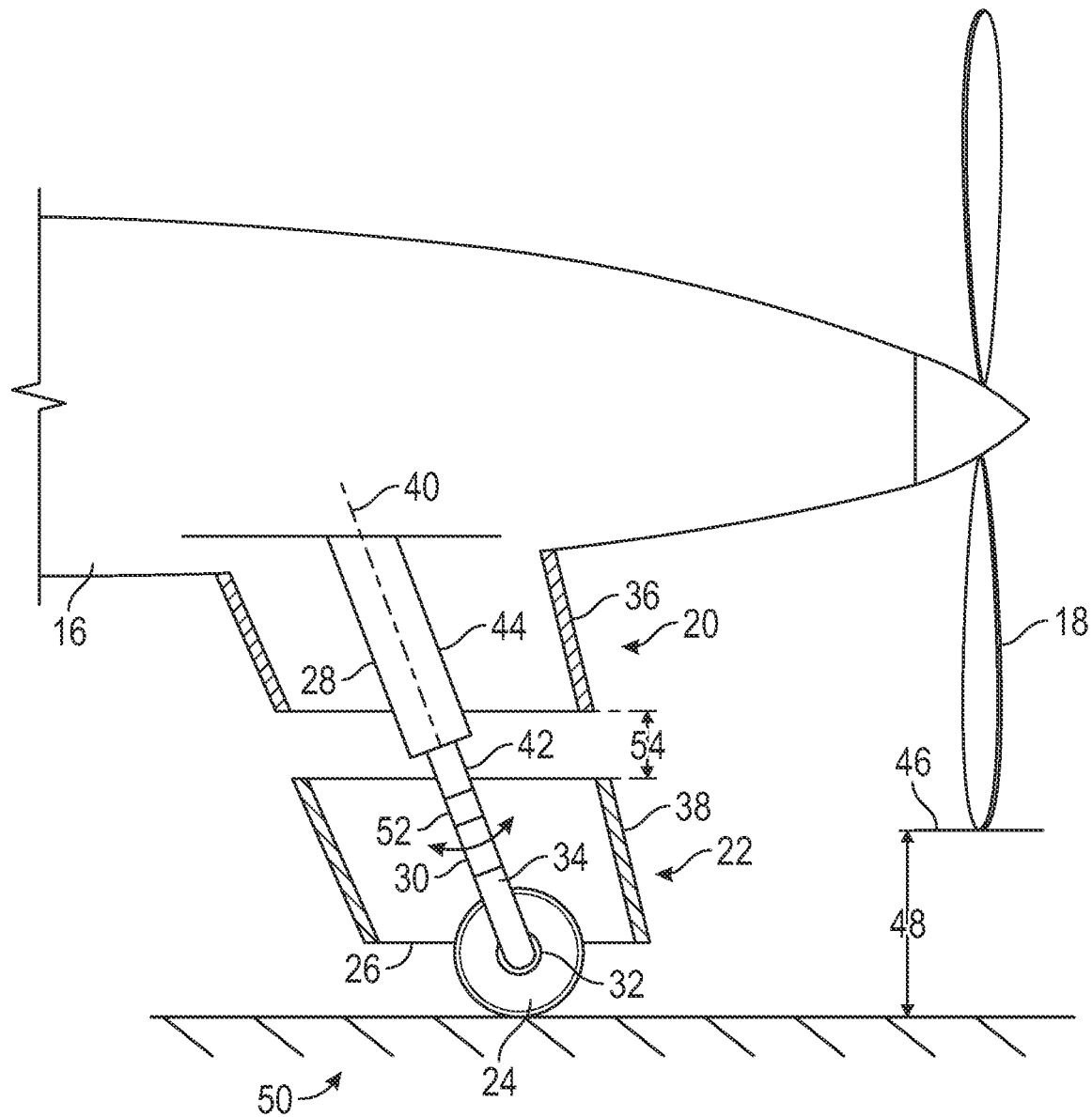
FIG. 2 is a partial cross-sectional view of an embodiment of a tailwheel assembly for a helicopter.

Referring to FIG. 2, a tailwheel assembly 22 is located in the ventral fin 20 such that at least a portion of a tailwheel 24 protrudes from a distal end 26 of the ventral fin 20. The tailwheel assembly 22 further includes a strut 28 secured to the airframe structure of the helicopter 10 and extending from the extending tail 16 through the ventral fin 20. The strut 28 is connected to and supports the tailwheel 24 through a yoke 30 connected to strut 28 and the tailwheel 24 by a tailwheel axle 32 extending through the tailwheel 24 and into one or more yoke arms 34 of the yoke 30. It is to be appreciated that although a yoke 30 is shown in the embodiment of FIG. 2, the tailwheel 24 may be supported in other ways, for example by direct connection between the strut 28 and the tailwheel axle 32.

The ventral fin 20 includes at least two portions. An airframe portion 36 is secured to and extends from the extending tail 16, while a tailwheel portion 38 of the ventral fin 20 is secured to the tailwheel assembly 22 at, for example, the yoke 30 such that its position is fixed relative to the tailwheel 24.

Figure 3:
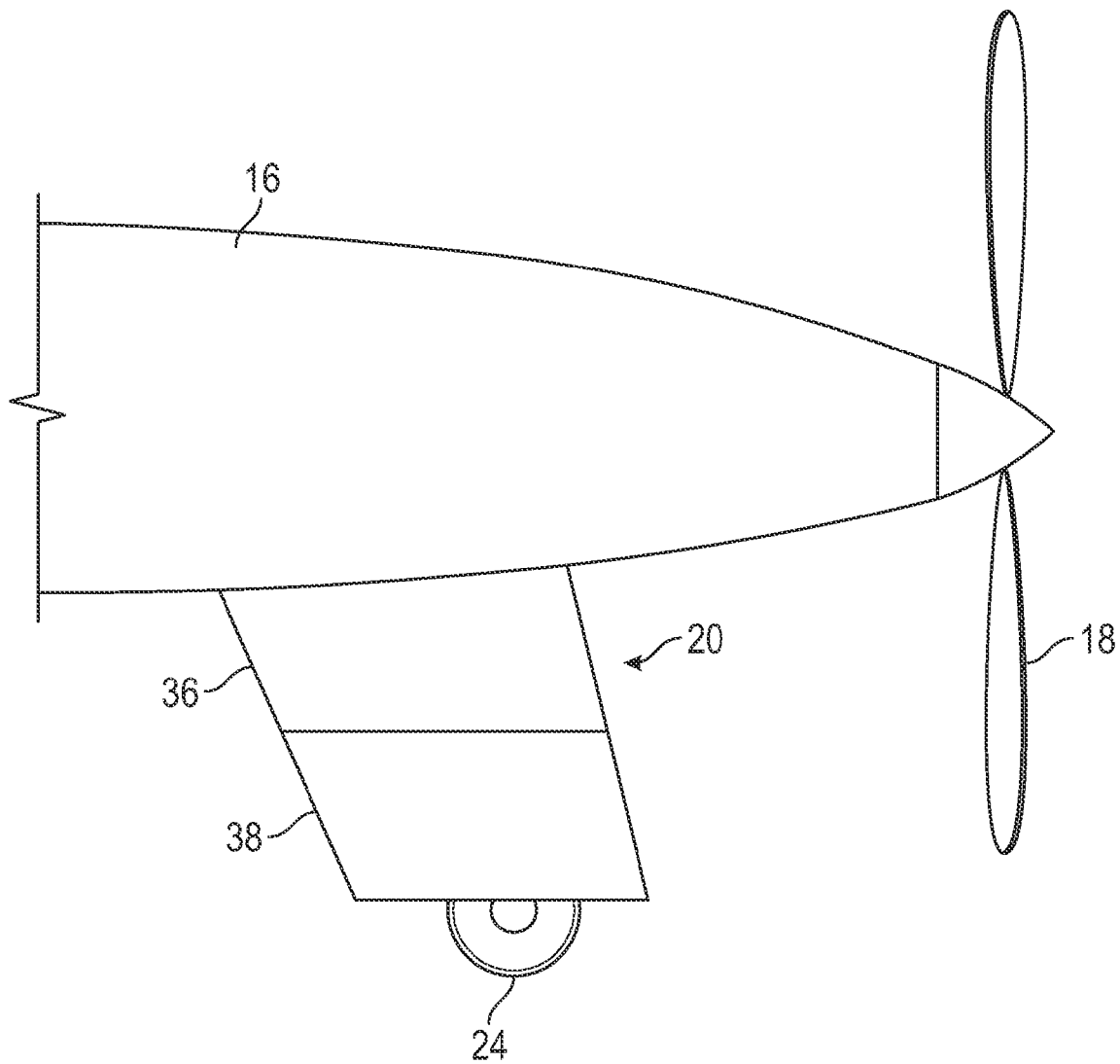
FIG. 3 is a partial cross-sectional view of an embodiment of a tailwheel assembly of a helicopter in a retracted position.

Referring now to FIG. 3, the strut 28 is extendable or telescoping along a strut axis 40. The extendable operation of the strut 28 of FIG. 3 is accomplished via a hydraulic fluid pressure. When hydraulic fluid is urged into the strut 28, pressure is increased causing an extendable portion 42 of the strut 28 to be extended from a fixed base portion 44 of the strut 28. Conversely, when hydraulic fluid is removed, pressure is decreased causing the extendable portion 42 retracts into the base portion 44. While hydraulic fluid is used to extend and retract the strut 28 in the embodiment of FIG. 3, in other embodiments other means for extending and retracting the strut 28, for example, pneumatic cylinder, electromechanical actuator or the like, may be utilized. The extension and/or retraction of the strut 28 may be controlled by an aircraft control system 66, or in other embodiments may be controlled via pilot inputs.

With the strut 28 in the extended position, the tailwheel 24 extends below a radial extent 46 of the tail propeller 18. As such, it is advantageous to extend the strut 28 for ground operations of the helicopter 10 to ensure a clearance 48 between the tail propeller 18 and ground 50 or other surface the helicopter 10 is operating on. In some embodiments, the clearance 48 is between about 1 and 3 inches or more depending on desired ground performance of the helicopter 10 and ground 50 conditions. The hydraulic pressure is adjustable allowing for varying amounts of extension, and shock absorption in the tailwheel assembly 22 when landing the helicopter 10 and performing ground operations. In some embodiments, the stroke of the strut 28 is between 6 and 18 inches.

Extending the strut 28 results in a fin gap 54 between the tailwheel portion 38 and the airframe portion 36 of the ventral fin 20. Further, the strut 28 includes one or more joints 52, for example swivel joints, along its length to allow rotation or other movement of the tailwheel 24, along with the tailwheel portion 38 of the ventral fin 20. The joints 52 and the fin gap 54 allow for rotation, steering or castering of the tailwheel 24 about, for example, the strut axis 40. In some embodiments, the joints 52 allow for 360 degree swivel rotation of the tailwheel 24.

Leaving the strut 28 in the extended position during flight, for example during high speed flight of the helicopter 10, increases an aerodynamic drag profile of the ventral fin 20 and also results in a relatively high turbulence in an airflow 56 approaching the tail propeller 18 located rearward of the ventral fin 20 because of the fin gap 54. As such, once the helicopter 10 is airborne, or is operating in a high-speed flight profile, the strut 28 is retracted into a retracted position. Retracting the strut 28 closes or eliminates the fin gap 54 between the tailwheel portion 38 and the airframe portion 36 of the ventral fin 20. Thus, the aerodynamic drag is reduced and turbulence of the airflow 56 approaching the tail propeller 18 is reduced.

The extension and retraction of the strut 28, and along with it the ventral fin 20, results in improved performance and safety during ground operations by allowing for steering of the tailwheel 24 while ensuring ground clearance 48 of the tail propeller 18 with the strut 28 in the extended position. Further, with the strut 28 in the retracted position, flight performance is improved via reduction of drag of the ventral fin 20 and reducing turbulence in the airflow 56 approaching the tail propeller 18.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tailwheel assembly for an aircraft comprising:
    a ventral fin including:
        a fixed airframe portion of the ventral fin; and
        a moveable tailwheel portion of the ventral fin;
    a tailwheel strut extending through the ventral fin including:
        a fixed first strut portion; and
        an extendable second strut portion having the moveable tailwheel portion of the ventral fin secured thereto; and
    a tailwheel secured to the extendable second strut portion;
    wherein a position of the tailwheel and of the moveable tailwheel portion of the ventral fin are changeable along a linear path parallel to a tailwheel strut axis by extension of the second strut portion.

2. The tailwheel assembly of claim 1, further comprising one or more strut joints in the tailwheel strut to allow for rotation of the tailwheel.

3. The tailwheel assembly of claim 1, wherein the extendable second strut portion includes a yoke, with the tailwheel secured thereto.

4. The tailwheel assembly of claim 3, wherein the tailwheel portion of the ventral fin is secured to the yoke.

5. The tailwheel assembly of claim 1, wherein the extendable second strut portion is extended by hydraulic pressure.

6. The tailwheel assembly of claim 1, wherein the extendable second strut portion is extendable by between about 6 and 18 inches.

7. The tailwheel assembly of claim 1, wherein extension of the extendable second strut portion moves the tailwheel portion of the ventral fin such that a gap is formed between the tailwheel portion and the airframe portion.

8. The tailwheel assembly of claim 1, wherein the tailwheel at least partially extends from a distal end of the tailwheel portion of the ventral fin.

9. A helicopter comprising:
    an airframe including an extending tail;
    a tailwheel assembly including:
        a ventral fin including:
            a fixed airframe portion of the ventral fin secured to the extending tail; and
            a moveable tailwheel portion of the ventral fin;
        a tailwheel strut extending through the ventral fin including:
            a fixed first strut portion; and
            an extendable second strut portion having the moveable tailwheel portion of the ventral fin secured thereto; and
        a tailwheel secured to the extendable second strut portion;
        wherein a position of the tailwheel and of the moveable tailwheel portion of the ventral fin are changeable along a linear path parallel to a tailwheel strut axis by extension of the second strut portion.

10. The helicopter of claim 9, further comprising a tail propeller disposed at the extending tail.

11. The helicopter of claim 10, wherein the tailwheel is extendable downwardly beyond a radial extent of the tail propeller.

12. The helicopter of claim 9, wherein extension of the extendable second strut portion moves the tailwheel portion of the ventral fin such that a gap is formed between the tailwheel portion and the airframe portion.

13. The helicopter of claim 9, further comprising one or more strut joints in the tailwheel strut to allow for rotation of the tailwheel.

14. The helicopter of claim 9, wherein the extendable second strut portion is extended by hydraulic pressure.

15. The helicopter of claim 9, wherein the extendable second strut portion is extendable by between about 6 and 18 inches.

16. The helicopter of claim 9, wherein moving the extendable second strut portion to a retracted position closes a gap is between the tailwheel portion and the airframe portion.

17. A method of operating a tailwheel assembly for an aircraft comprising:
   extending an extendable portion of a tailwheel strut from an airframe of the aircraft, the tailwheel strut having a tailwheel secured thereto and disposed at least partially in a ventral fin of the aircraft; and
   moving a tailwheel portion of the ventral fin and the tailwheel away from a fixed airframe portion of the ventral fin in linear path parallel to a tailwheel strut axis via extension of the extendable portion of the tailwheel strut.

18. The method of claim 17, wherein the moving of the tailwheel portion of the ventral fin away from the fixed airframe portion of the ventral fin results in a gap between the tailwheel portion of the ventral fin and the fixed airframe portion of the ventral fin.

19. The method of claim 17, further comprising retracting the extendable portion of the tailwheel strut thereby moving the tailwheel portion of the ventral fin toward the fixed airframe portion of the ventral fin.

20. The method of claim 17, wherein the tailwheel is disposed at an extended tail of a helicopter forward of a tail propeller.

\* \* \* \* \*